United States Patent [19]

Knieriem et al.

[11] Patent Number: 5,345,339
[45] Date of Patent: Sep. 6, 1994

[54] MOTORIZED MIRROR ASSEMBLY

[75] Inventors: Alan S. Knieriem, Syracuse; Richard A. Tamburrino, Auburn, both of N.Y.

[73] Assignee: Welch Allyn, Inc., Skaneateles Falls, N.Y.

[21] Appl. No.: 11,165

[22] Filed: Jan. 29, 1993

[51] Int. Cl.$^5$ .......................... G02B 23/00; G02B 7/00
[52] U.S. Cl. .................................. 359/872; 359/367; 128/4
[58] Field of Search ............... 359/367, 198, 200, 223, 359/503–506, 896, 871–882, 417–419, 427–428; 356/241; 128/4, 6; 358/98; 200/60

[56] References Cited

U.S. PATENT DOCUMENTS 4,557,598  12/1985  Ono et al. .................... 356/241
5,122,900  6/1992  Tamburrino et al.

FOREIGN PATENT DOCUMENTS 155947  8/1985  Japan .................... 356/241
239517  9/1989  Japan .................... 128/4
183214  7/1990  Japan .................... 358/98

*Primary Examiner*—Edward K. Look
*Assistant Examiner*—James A. Larson
*Attorney, Agent, or Firm*—Harris Beach & Wilcox

[57] ABSTRACT

A motorized mirror assembly attaches to a borescope insertion tube for rotating a mirror to provide side viewing capability. A housing for a motor/gearbox has an access port at one end that provides access to a shaft driven by the motor/gearbox for attachment to a side-viewing mirror. The assembly includes a battery enclosure into which a battery is inserted. The housing and battery enclosure have diameters that do not exceed the diameter of the borescope insertion tube. Power is switchably supplied to the motor/gearbox by an arrangement in which a ring retainer is connected to the housing, and a compression spring is mounted in electrical contact with one of the battery terminals and with an electrical terminal on the motor/gearbox. The tension exerted by the spring urges the motor/gearbox against a surface of the housing, and also pushes the battery against the wall of the battery enclosure to establish secure electrical continuity therebetween. A switch arrangement includes a rotatable contact ring, immobilized by slots that engage studs projecting from an external ring that rotates about the ring retainer to urge the contact ring into rotation therewith, the contact ring coming in and out of electrical contact with a second electrical contact terminal. The battery enclosure is connected to the other end of the external ring and has a removable cap to allow installation and removal of the battery. Thus a battery can be removed and a replacement battery installed without disturbing the contact ring.

7 Claims, 3 Drawing Sheets

MOTORIZED MIRROR ASSEMBLY

BACKGROUND OF THE INVENTION

1. Field of the Invention

This invention relates to a mirror assembly attachment for the distal end of a borescope insertion tube, and more particularly to a self-contained motorized assembly for rotating a mirror and providing a 360 degree side-looking view in a standard video borescope.

2. Description of the Prior Art

In many industrial applications where borescopes are used, they have to be inserted a considerable distance into inaccessible cavities for viewing the interior thereof. In long, narrow cavities, and particularly in pipes, it is sometimes difficult to distinguish points of interest on the walls thereof when looking straight ahead through the distal end of the borescope insertion tube.

Accordingly, for some time it has been a common practice to provide angled mirrors for allowing viewing at an angle to the axis of the insertion tube of the borescope including fixed angular mirrors at the end of a standard borescope and various rotated mirrors, all of which to a degree have allowed viewing of the interior surface walls of the enclosure adjacent the tip of the insertion tube. An angled mirror rotating about the axis of the insertion tube produces a so-called side viewing capability for looking at the walls of a pipe, for instance, as the insertion tube is traversed through the pipe. Rotatable mirrors of this type have been used to reflect the source of light in the distal end of the insertion tube onto the wall of the tube, as the mirror rotates and to pick up the reflected video image so as to scan the entire inside circumference of the pipe as the insertion tube is moved therethrough.

Since in some installations the borescope insertion tube can have a length of ten to fifty feet, it is important that this adaptor, when mounted on the distal end of a borescope insertion tube be securely fixed thereto so it cannot be accidentally dislodged or disengaged and lost in the interior of a narrow elongated cavity such as a steam pipe.

U.S. Pat. No. 5,122,900 of common assignee herewith discloses a self-contained motorized mirror assembly that can be removably mounted on the distal end of a borescope insertion tube. This assembly has a self-locking attachment, and an integral on/off switch and battery cap assembly for controlling power to the motor for the rotatable mirror. With this device rotatable mirrors are easily interchanged. However the mirror assembly is larger than the distal portion of the insertion tube. Also the switching mechanism is involved with the battery compartment, and it is not feasible to change batteries without disturbing the switching mechanism.

SUMMARY OF THE INVENTION

It is therefore a primary object of the present invention to provide a motorized mirror assembly having a reduced diameter, so that a borescope attached thereto has increased capabilities of negotiating small cavities.

It is yet another object of the present invention to provide a motorized mirror assembly for the distal end of a borescope that allows the operator to replace batteries without disturbing the switching mechanism.

It is a further object of the present invention to provide a smaller, lighter, and more reliable motorized mirror assembly for the distal end of a borescope.

These and other objects of the present invention are attained by a motorized mirror assembly attachable to the distal end of a borescope insertion tube for rotating a mirror about the axis thereof to provide a side viewing capability. A housing for a motor/gearbox has an access port at one end that provides access to a shaft driven by the motor/gearbox. A side-viewing mirror is detachably mounted on the shaft and rotates when the motor/gearbox is activated to view an annular field about the borescope. The assembly includes a battery enclosure into which one or more batteries are inserted, the batteries being accessible through a battery cap for replacement when needed. The housing and battery enclosure have diameters that do not exceed the diameter of said borescope insertion tube.

According to one aspect of the invention, power is switchably supplied to the motor/gearbox by an arrangement in which a ring retainer is connected to the housing, and a compression spring is mounted in electrical contact with one of the battery terminals and with an electrical terminal on the motor/gearbox. The tension exerted by the spring urges the motor/gearbox against a surface of the housing, and also pushes the battery against the wall of the battery enclosure to establish secure electrical continuity therebetween. Power is switched on and off by a switch arrangement that includes a rotatable contact ring, held inside the ring retainer by slots in which ride inwardly projecting studs of an external ring. An end portion of the external ring surrounds a portion of the ring retainer, and the external ring rotates about the ring retainer to urge the contact ring into rotation therewith, a projection on the contact ring coming in and out of electrical contact with a second electrical contact point or terminal of the motor/gearbox. The ring retainer has slotted openings that form a track for the inwardly projecting studs of the external ring, so that the external ring can advance and rotate over the ring retainer. The battery enclosure is connected to the other end of the external ring and has a removable cap to allow installation and removal of the battery. Thus a battery can be removed and a replacement battery installed without disturbing said contact ring.

According to another aspect of the invention, the proximal end of the ring retainer has additional slots that engage pins or lugs on the motor/gearbox to immobilize the motor/gearbox in its housing and prevent its rotation when the motor is powered on. The motor/gearbox includes a specially adapted cylindrical contact assembly positioned at an end thereof. The contact assembly has a first terminal on its external circumferential surface which is slightly recessed to clear the housing, and a second terminal located on a free end of the assembly in contact with the compression spring.

BRIEF DESCRIPTION OF THE DRAWINGS

For a better understanding of these and other objects of the present invention, reference is made to the detailed description of the invention which is to be read in conjunction with the following drawings, wherein:

FIG. 4 is a sectional view through line 4—4 of FIG. 3.

DESCRIPTION OF THE PREFERRED EMBODIMENT

Figure 1:
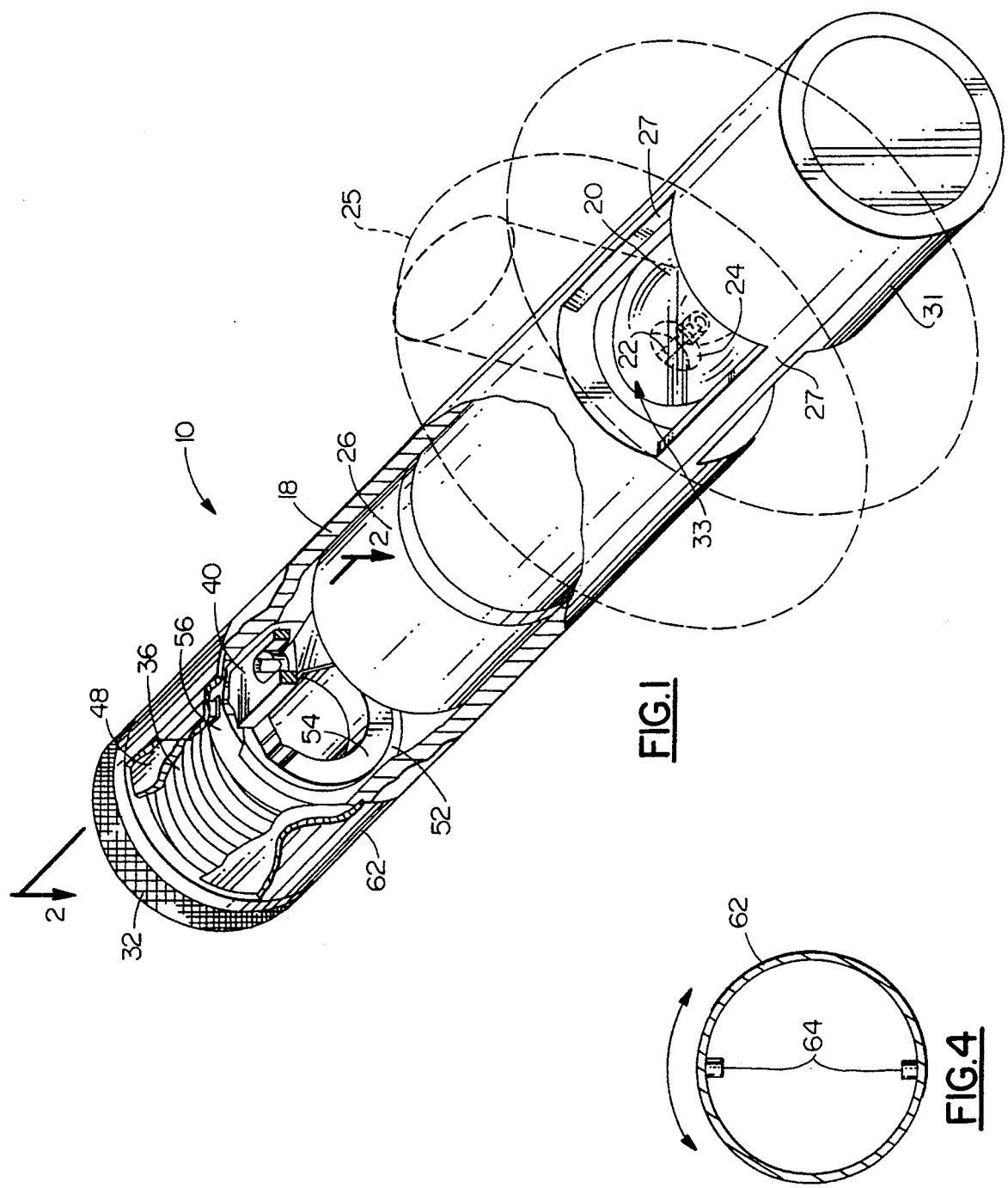
FIG. 1 is a perspective view, partially broken away, of a motorized mirror assembly in accordance with the invention.
Figure 2:
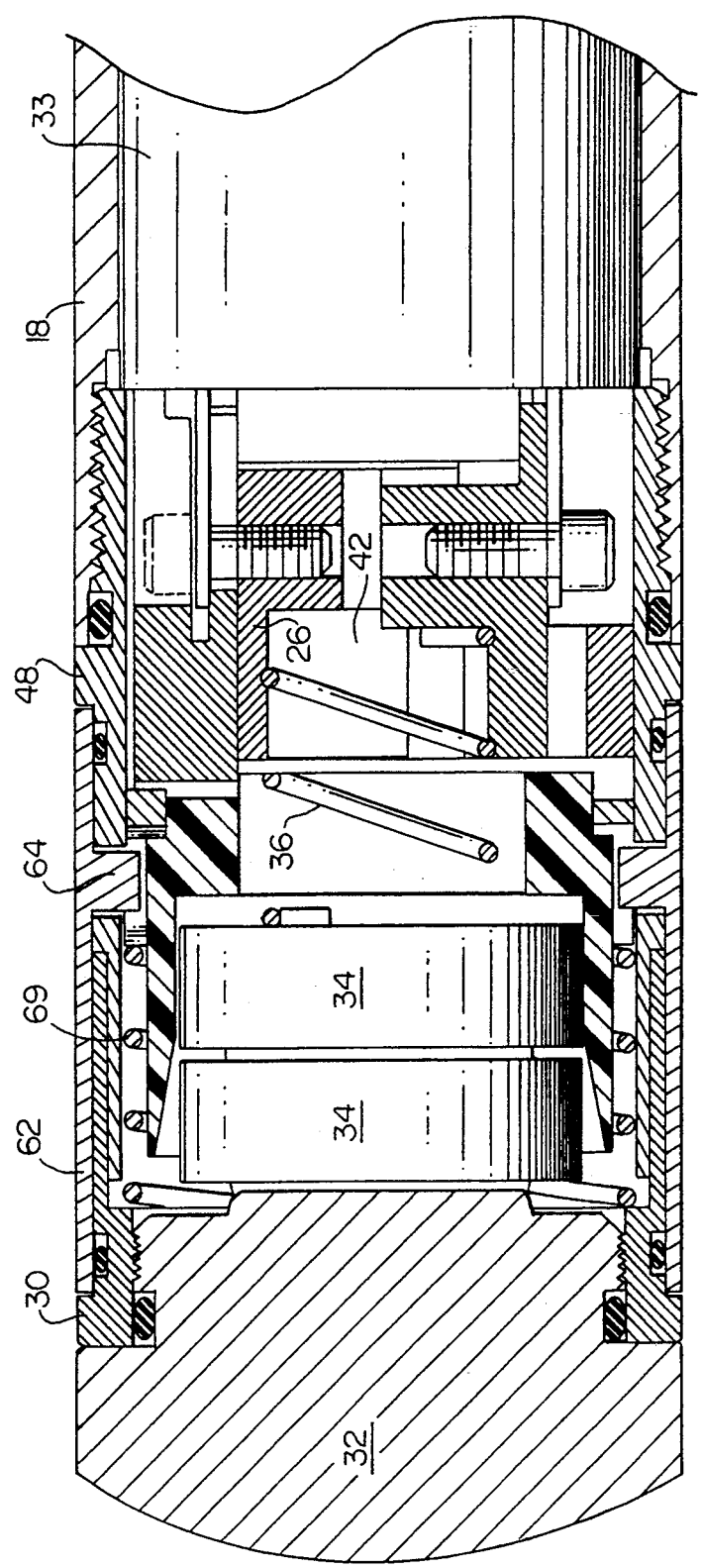
FIG. 2 is a partial sectional view through line 2—2 of FIG. 1.
Figure 3:
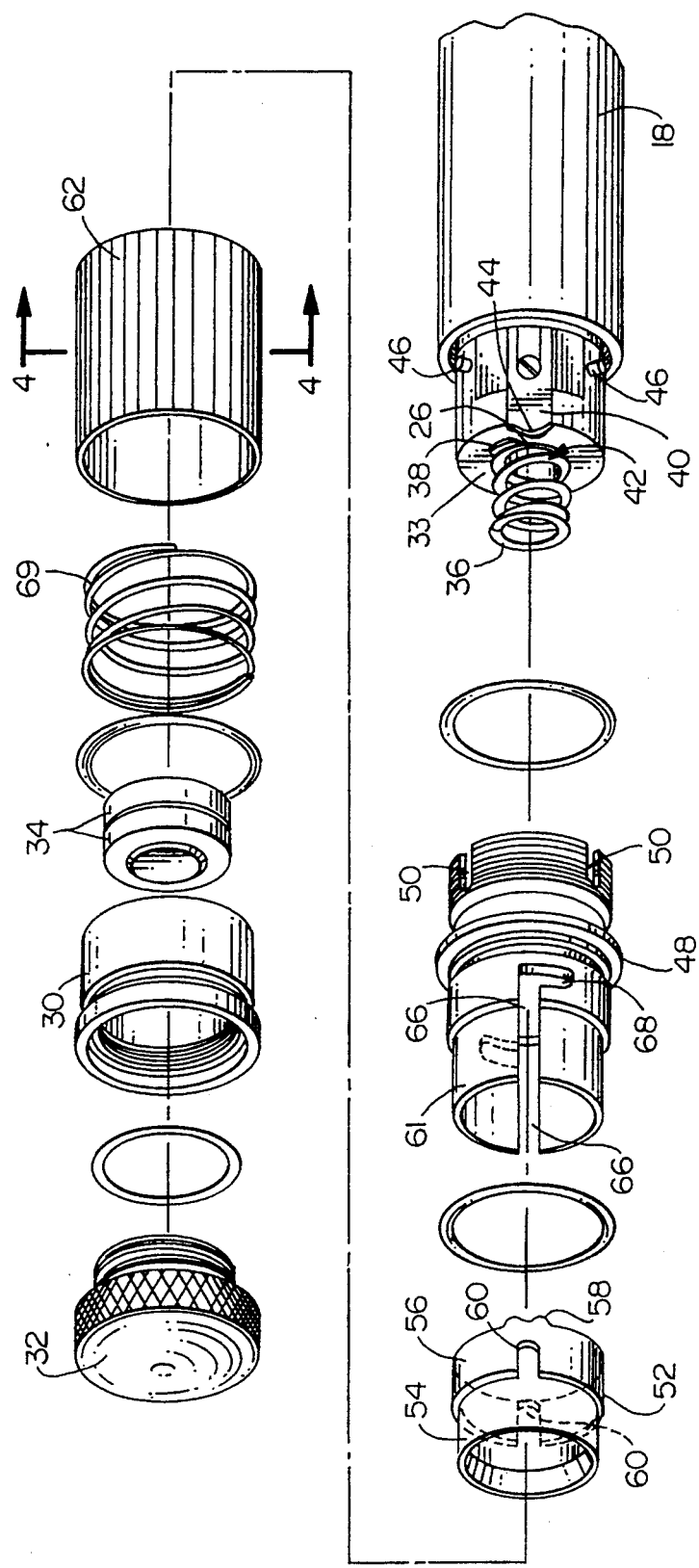
FIG. 3 is an exploded view of the distal portion of the assembly of FIG. 1.

Referring now to FIGS. 1-3 of the drawings, a motorized mirror assembly 10 according to the present invention includes a housing 18 which contains a motor/gearbox 33 having a specially adapted contact support assembly 26, and a side-viewing mirror 20 which is mounted at an angle on an axial shaft 22 which extends from the motor/gearbox 33 through a port 24 in the proximal end of housing 18. When motor/gearbox 33 is actuated, the mirror 20 rotates about the axis of shaft 22 to provide a 360° annular field of view 25 of a cavity being inspected, shown by the dotted lines in FIG. 1. A video pickup (not shown), conventionally placed in the distal portion of the insertion tube receives images from the mirror, and transmits the video information to the borescope display apparatus. Shaft 22 may be provided with a key and keyway, and the mirror 20 fixed thereon by a set screw in the usual fashion for convenient interchangeability with other mirrors having different reflective characteristics or angles relative to the axis thereof. Standoffs 27, 27 are provided to connect the housing 18 to the head connector 21 of the borescope insertion tube (not shogun), and to provide a clearance for the rotating mirror 20. These standoffs can be struts, or self-locking pins as taught in the above-noted U.S. Pat. No. 5,122,900, which is incorporated herein by reference.

The distal end of the assembly includes a battery enclosure 30, having one or more batteries 34, 34 therein, and a battery cap 32 threadable thereon to provide convenient access for removing a spent battery and installing a replacement. Batteries 34, 34 are preferably a cylindrical silver oxide type, such as Eveready No. 397. One terminal is grounded through the battery enclosure 30 to the housing 18, while another terminal is in contact with compression spring 36, fabricated of an electrically conductive metal, which extends axially through battery enclosure 30 and housing 18 to attach to a centrally located terminal 38 of motor/gearbox contact support assembly 26 that is electrically isolated from ground. Contact support assembly 26 is provided with a second electrical terminal 40 which is disposed in a recess of contact support assembly 26.

Ring-retainer 48 is a multifunctional component which has a diameter not exceeding that of the housing. The externally threaded proximal end of the ring-retainer is provided with slots 50, 50. In assembly the ring-retainer is threaded into housing 18, overriding contact support assembly 26 and the distal portion of the motor/gearbox 33, and the slots 50, 50 align with lugs 46, 46 that project from the external surface of the motor/gearbox 33. The motor/gearbox 33 and lugs are dimensioned such that the entire motor/gearbox 33 is slidable into the housing 18, and cooperation of the slots 50, 50 on the ring-retainer 48 with the lugs 46, 46 prevents the motor/gearbox 33 from rotating therein. The interior wall of ring-retainer 48 is electrically isolated from terminal 40.

A rotatable contact ring 52 is disposed within ring retainer 48 and the distal portion of housing 18. The contact ring has an inner insulated portion 54 that surrounds compression spring 36, maintaining the spring in electrical isolation from an outer conductive portion 56. Conductive portion 56 is provided with a protuberance 58 that rotates in and out of contact with a mating projection 44 on the end of terminal 40, which extends longitudinally along the recess in the external surface of contact support assembly 26 to maintain electrical isolation from housing 18. Rotation of contact ring 52 within ring-retainer 48 about the axis of the assembly thus makes and breaks electrical contact with the contact support assembly of the motor/gearbox 33. An external compression spring 69 urges the contact ring 52 into contact with electrical terminal 40.

The distal portion 61 of ring-retainer 48 is ensheathed by an external ring 62, having an external diameter substantially the same as that of the head connector 31. External ring 62 is intended to be grasped by a user and rotated about the ring-retainer. It is provided with internal lugs 64, 64 (see FIG. 4) that ride in slots 60, 60 of contact ring 52, so that the contact ring seats inside the external ring 62. Lugs 64, 64 are also carried in slots 66, 66 that are provided in the distal portion 61 of ring retainer 48. Slots 66, 66 each have a longitudinal leg that allows the external ring to advance over the ring retainer, and a lateral leg 68, that provides a track for rotation of the external ring 62 about the ring-retainer 48. When the user rotates the external ring, lugs 64, 64 urge contact ring 52 into rotation therewith, so that protuberance 58 is brought in and out of contact with terminal 40 as may be desired. When contact is made lugs 64, 64 establish electrical continuity between terminal 40 and ground.

Battery enclosure 30, preferably fabricated of an electrically conductive material, is held in physical and electrical contact with external ring 62. The enclosure 30 is dimensioned to slip-fit into the external ring 62, and can be held therein by any suitable adhesive.

From the foregoing it can be seen that the contacting 52 switches a current loop which runs sequentially from a first terminal of battery 34, through compression spring 36, terminal 38, contact support assembly 26, terminal 40, conductive portion 56, lugs 64, 64, external ring 62, battery enclosure 30, battery cap 32, and finally the second terminal of battery 34. Although the housing has been referenced as the ground for purposes of explanation, it will be appreciated that the terminals can equally be reversed.

To use the invention batteries 34, 34 are placed within battery enclosure 30, and the head connector 30 attached to the distal end of a borescope insertion tube. External ring 62 is rotated to complete the above-described electrical circuit, so that the motor/gearbox 33 is actuated to rotate mirror 20. In the event the batteries run down they can be replaced by simply unscrewing battery cap 32, removing the batteries 34, 34 inserting replacement batteries, and reattaching battery cap 32. It is evident that the batteries can be replaced without disassembling the electrical switch mechanism, or otherwise interfering therewith.

While this invention has been explained with reference to the structure disclosed herein, it is not confined to the details set forth and this application is intended to cover any modifications and changes as may come within the scope of the following claims:

What is claimed is:

1. A motorized mirror assembly attachable to the distal end of a borescope insertion tube for rotating a mirror about the axis thereof to provide a side viewing capability, comprising:

a housing having an access port at one end;

a motor/gearbox disposed in said housing having a shaft, a first electrical terminal and a second electrical terminal, said access port allowing access to said shaft;

a side-viewing mirror that is detachably mounted on said shaft for rotation therewith;

a battery enclosure and a battery removably disposed therein;

a ring retainer connected to said housing;

switch means for completing an electrical circuit between said battery and said motor/gearbox, said switch means alternating between a power-on state and a power-off state, said switch means comprising:

an external ring having a first end portion that surrounds a portion of said ring retainer, a second end, and inwardly projecting studs;

a contact ring disposed in said ring retainer and rotatable about an axis thereof, said contact ring having slots formed therein that are engaged by said inwardly projecting studs of said external ring to urge said contact ring into rotation therewith to make and break electrical contact with said first electrical terminal of said motor/gearbox, said ring retainer having openings therethrough that allow said external ring to advance thereover, said battery enclosure being connected to said second end of said external ring and having an access means to allow installation and removal of said battery; and electrical contact means connected to said switch means, comprising a compression spring, mounted in electrical contact with a terminal of said battery and said second electrical terminal of said motor/gearbox, urging said motor/gearbox against said housing, and urging said battery against said battery enclosure to establish secure electrical continuity therebetween;

whereby said battery can be removed and a replacement battery installed without disturbing said contact ring and without affecting said states of said switch means.

2. The assembly according to claim 1, wherein said housing and said battery enclosure have diameters that do not exceed the diameter of the borescope insertion tube.

3. The assembly according to claim 1, wherein said ring retainer has means for immobilizing said motor/gearbox in said housing.

4. The assembly according to claim 1, wherein said battery enclosure comprises a removable cap disposed at an end thereof.

5. A motorized mirror assembly attachable to the distal end of a borescope insertion tube for rotating a mirror about the axis thereof to provide a side viewing capability, comprising:

a housing having a motor/gearbox disposed therein, said motor/gearbox having a shaft that is accessible through a port in said housing;

stand-off means attached to said housing for accommodating a side viewing mirror that is detachably mounted on the motor shaft for rotation therewith;

a battery enclosure and a battery disposed therein, said battery enclosure having a removable cap for installation and removal of said battery;

electrical contact means for connecting said battery and said motor/gearbox in an electrical circuit, said electrical contact means including switch means having a power-on position and a power-off position for enabling and disabling electrical continuity between said battery and said motor/gearbox, said electrical contact means comprising:

having slots therein for engaging pins that project from said motor/gearbox to secure said motor/gearbox in a fixed position in said housing;

a compression spring, mounted in electrical contact with a first terminal of said battery and a contact of said motor/gearbox, urging said motor/gearbox against said housing, and urging said battery against said battery enclosure to establish secure electrical continuity therebetween;

said switch means comprising:

a contact ring, disposed in said ring retainer and rotatable about an axis thereof, slots of said contact ring engaging inwardly projecting studs of an external ring having a first end portion that surrounds a portion of said ring retainer for rotation thereabout to urge said contact ring into rotation therewith to make and break electrical contact with a second electrical terminal, said ring retainer having openings therethrough that allow said external ring to advance thereover;

said battery enclosure being connected to a second end of said external ring and having an access for installation and removal of said battery;

whereby said battery can be removed and a replacement battery installed without disturbing said contact ring and without affecting said positions of said switch means.

6. The assembly according to claim 5, wherein a diameter of said housing does not exceed the diameter of the borescope insertion tube.

7. The assembly according to claim 5, wherein said motor/gearbox includes a cylindrical contact assembly disposed at an end thereof, said contact assembly includes said second terminal disposed on an external circumferential surface of said contact assembly, and an additional terminal disposed on a free end of said contact assembly for contact with said compression spring.

* * * * *

UNITED STATES PATENT AND TRADEMARK OFFICE
CERTIFICATE OF CORRECTION

PATENT NO. : 5,345,339
DATED : September 6, 1994
INVENTOR(S) : Alan S. Knieriem et al.

It is certified that error appears in the above—identified patent and that said Letters Patent is hereby corrected as shown below:

Col. 6, after line 18, please add --a ring retainer connected to said housing and--.

Signed and Sealed this

Twenty-ninth Day of November, 1994

Attest:

BRUCE LEHMAN

Attesting Officer

Commissioner of Patents and Trademarks